Nov. 16, 1937.   H. T. LAMBERT   2,099,489
POWER TRANSMISSION
Filed Feb. 24, 1936   4 Sheets-Sheet 1
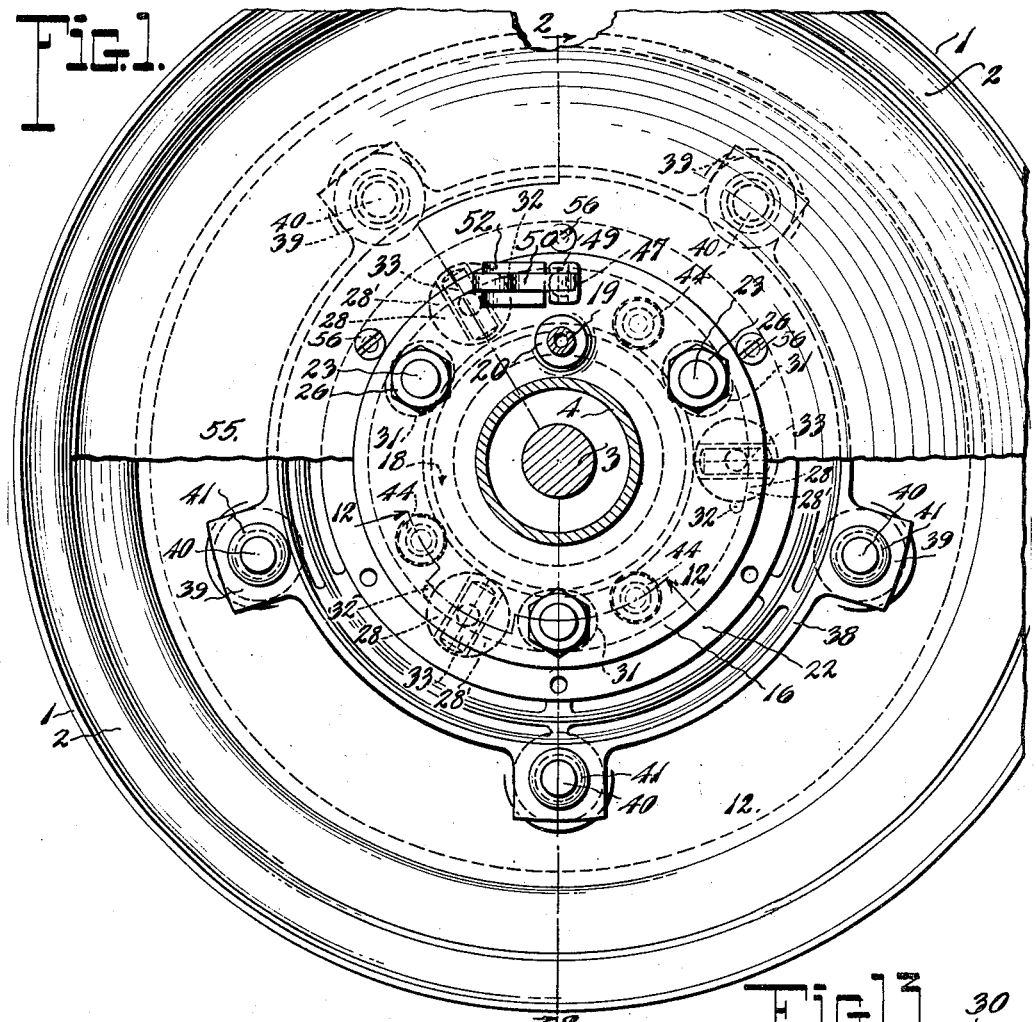
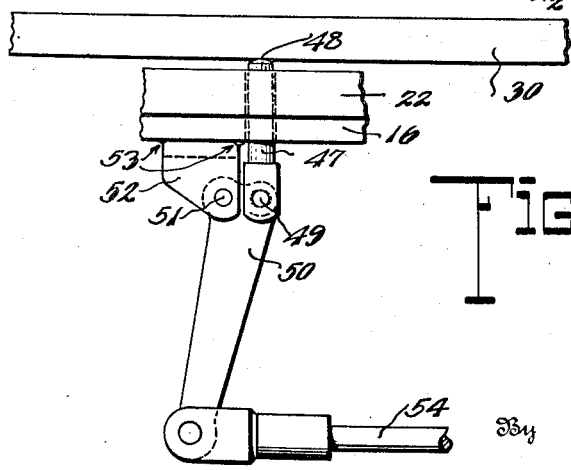
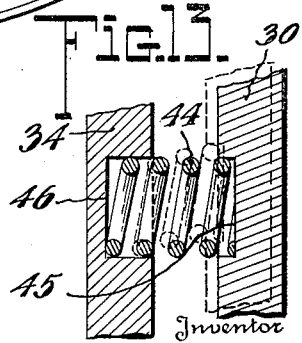
Inventor
H. T. Lambert
By Robert Robb
Attorneys

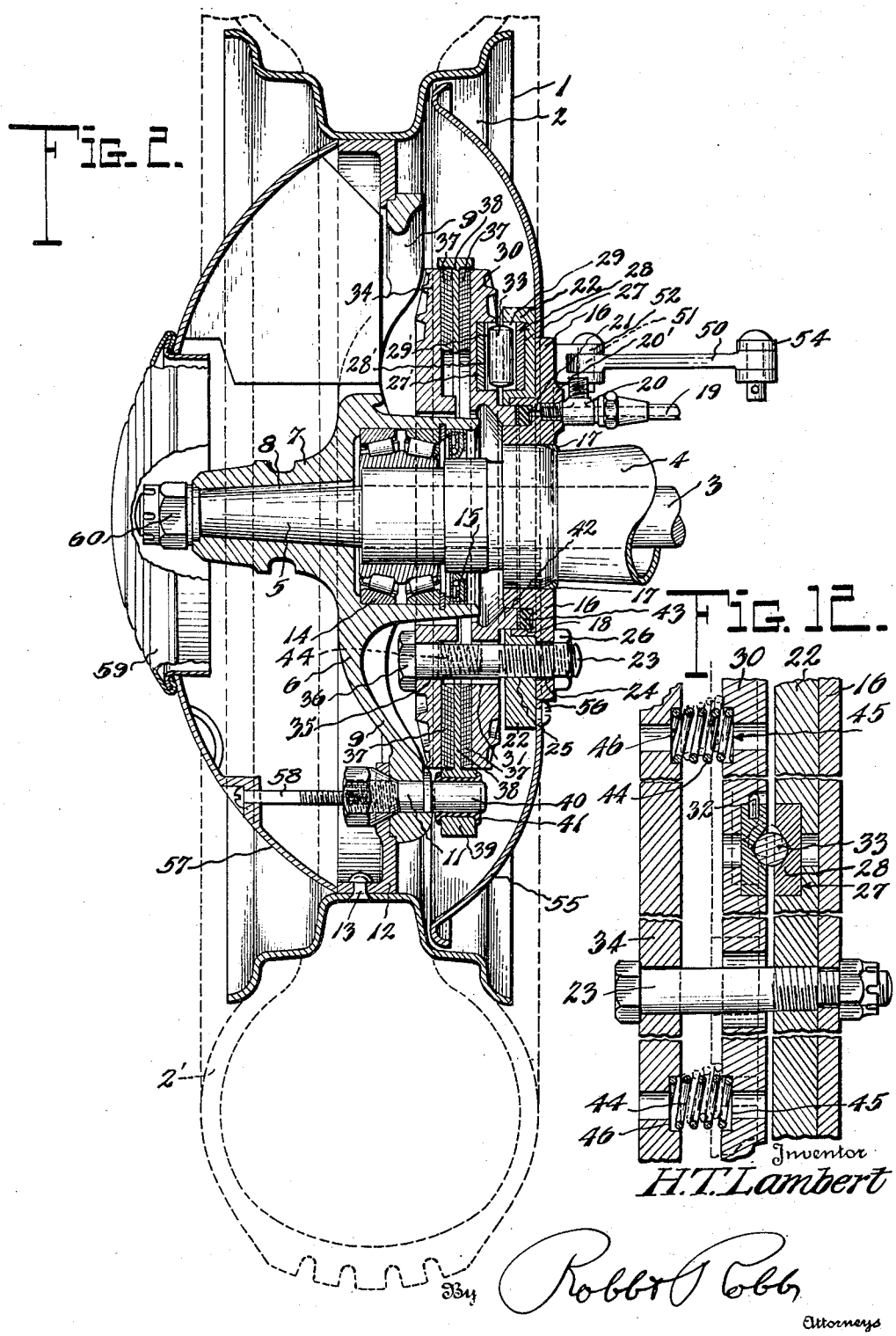

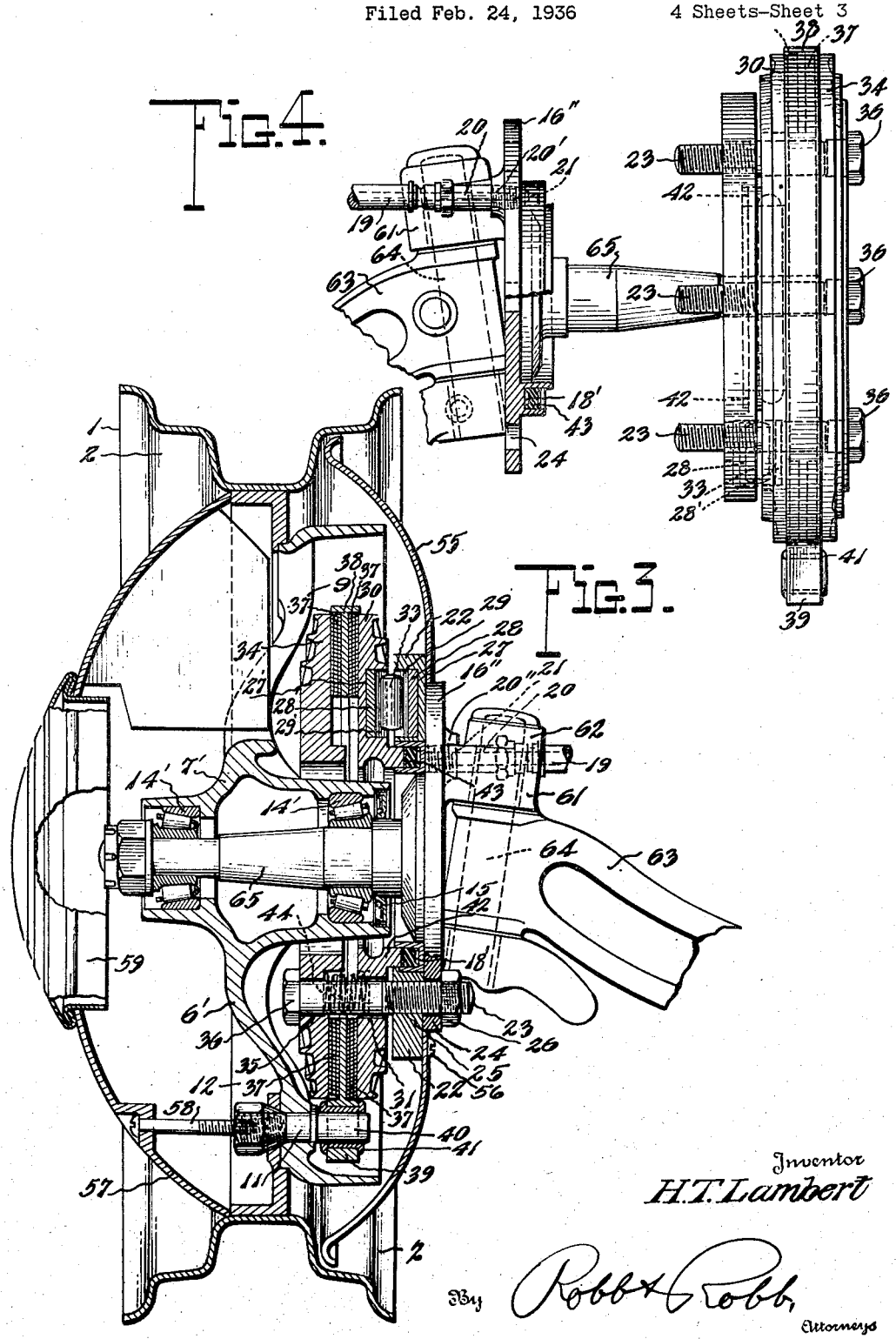

Nov. 16, 1937. H. T. LAMBERT 2,099,489
POWER TRANSMISSION
Filed Feb. 24, 1936 4 Sheets-Sheet 4
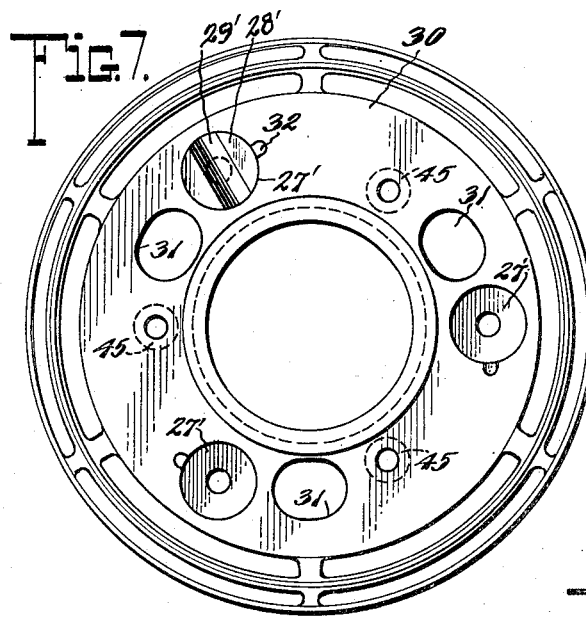
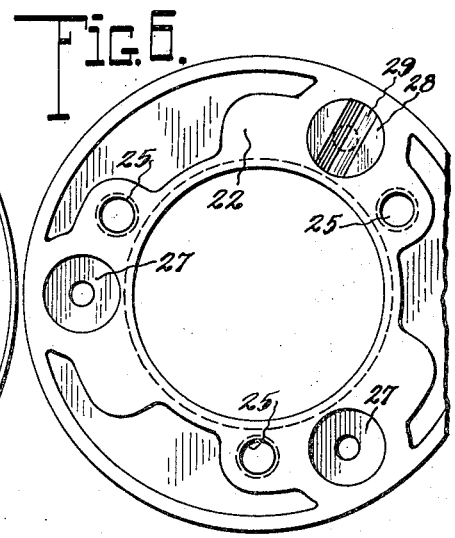
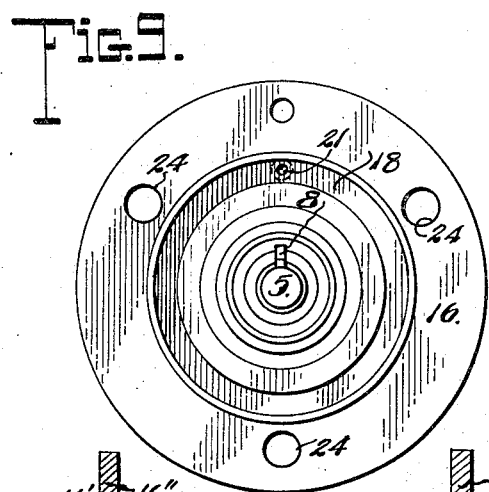
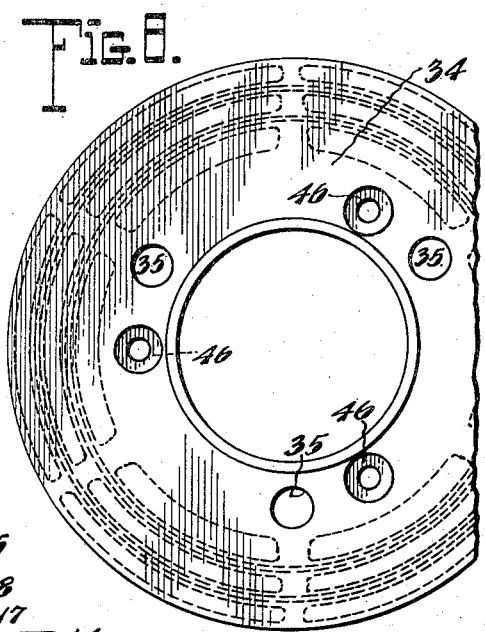
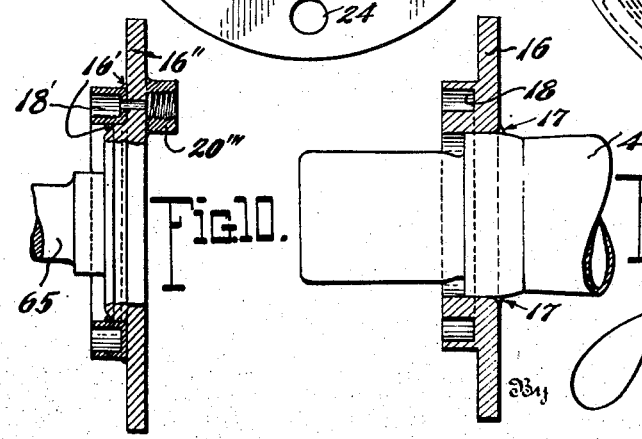
Inventor
H. T. Lambert
By Robb & Robb
Attorneys Patented Nov. 16, 1937

2,099,489

UNITED STATES PATENT OFFICE 2,099,489

POWER TRANSMISSION

Homer T. Lambert, St. Joseph, Mich.

Application February 24, 1936, Serial No. 65,459

12 Claims. (Cl. 188—72)

This invention appertains in a general sense to power transmission, and more especially to brake mechanism as one type of power transmission where the power is absorbed rather than maintained as in a clutch. However, as there is not a great difference between a brake and a clutch outside of the fact that in a brake the frictional resistance is opposed to the force of the power transmitted until the power is reduced to an amount less than it originally was or, in other words, is absorbed, while in a clutch the power output of the clutch is availed of to produce motion, the invention in its broader aspects is intended to relate to both fields.

In my copending application, Serial No. 716,401, filed March 19, 1934, I have disclosed the general type of brake mechanism on which the present invention is based, while in my application Serial No. 13,555, filed March 28, 1935, also co-pending, the brake mechanism is modified for hydraulic control. In both of these inventions, as well as in the present invention, the constructions of the brake mechanisms are such as to utilize the inertia or momentum of the part to be braked for producing a braking action which is proportional to the inertia or momentum, or, in other words, to the power to be absorbed. Thus the manual effort required to operate the brake is materially reduced, and only a very slight manual effort to initiate the brake operation is all that is necessary.

In the inventions of my previous applications above referred to, I have found that the parts of the brake mechanisms are not arranged so as to permit the same to be conveniently removed for purposes of repair or replacement of parts. Moreover, the connections of the manual controls, as disclosed, require substantial disassembly of parts, which means that their operating setting must be disturbed and then readjusted after the desired service has been performed on the brake mechanism proper. Of course, these mechanisms are quite satisfactory for the purposes for which they were intended; that is to say, their braking function is perfectly effective.

One of the principal objects of the present invention is to provide a brake mechanism of the general type of my previous applications hereinbefore referred to, wherein the parts have an improved and preferably unitary relation which permits the mounting and dismounting of the brake as a unit. By means of the improved design, the setting of the brake need not be disturbed if for some reason the dismounting of the same is desired. Moreover, the brake can be substantially completely assembled and set, with greater precision and convenience, before the same is mounted or installed in its service position. Also, if desired, the unit can be subsequently dismounted and tested and reset or adjusted in a more efficient manner than has heretofore been possible.

Another important object of the invention is to provide an auxiliary control in my improved brake mechanism, whereby to permit the brake mechanism to be operated independently of the inertia or momentum of the part to be braked on which the primary actuation is dependent. This auxiliary control is ideally suited for affording a so-called parking brake when the invention is applied to a motor vehicle.

Other and further objects and advantages of the invention will be hereinafter described, and the novel features thereof defined in the appended claims.

In the drawings:

Fig. 1 is a vertical sectional view taken through the rear axle of a vehicle adjacent the driving wheel or power driven wheel to which my improved brake mechanism has been applied, and showing a portion of the rear dust cover broken away to disclose the brake mechanism in elevation;

Fig. 2 is a vertical sectional view taken approximately on the line 2—2 of Fig. 1, the axle and housing being shown in elevation;

Fig. 3 is a sectional view generally similar to Fig. 2, wherein the brake mechanism is applied to the front or dirigible wheel, the steering spindle and front axle being shown in elevation;

Fig. 4 is a side elevation of the axle and steering spindle of Fig. 3, the wheel having been removed and showing further the brake assembly unit partly removed from its service position;

Fig. 5 is a fragmentary top plan view particularly disclosing the auxiliary or parking brake control mechanism with respect to the brake assembly unit;

Fig. 6 is a side elevation of the energizer or power plate which is normally disposed at the inboard side of the brake assembly unit when the unit is mounted in its service position, as viewed from the outboard side, certain of the insert discs being removed;

Fig. 7 is a side elevation of one of the relatively shiftable brake or friction discs which is adapted to be disposed adjacent the energizer plate of Fig. 6, as viewed from the side contiguously disposed respecting the latter, certain of the insert discs being omitted;

Fig. 8 is a side elevation of the outer or outboard brake or friction disc as viewed from the inboard side;

Fig. 9 is a side elevation of the rear axle and housing as shown in Fig. 2 with the wheel and brake assembly unit removed to disclose the fixed inboard plate which serves as the mounting for the brake assembly unit, and further disclosing the annular channel which is adapted to receive the hydraulic medium to actuate the brake mechanism;

Fig. 10 is a side elevation of a front wheel spindle, portions thereof being broken away and shown in section to disclose one form of channel construction for the brake assembly unit supporting plate;

Fig. 11 is a vertical sectional view taken through the brake assembly unit supporting plate for the rear axle, the housing being shown in elevation and the channel which receives the hydraulic medium for actuating the brake mechanism being formed as an integral part of the supporting plate;

Fig. 12 is a fragmentary, sectional view taken on the plane indicated by line 12—12 of Figure 1; and Fig. 13 is a fragmentary, detailed, sectional view of a slightly modified form of the spring mounting for returning the movable braking disc to its disengaged position.

Like reference characters designate corresponding parts in the several figures of the drawings.

Referring first to Figs. 1, 2 and 5, I have shown my improved brake mechanism applied to the rear wheel of a motor vehicle, the wheel being generally designated 1, and including a demountable rim 2 of well known construction to which the tire 2', shown in dotted lines, is applied.

It is to be understood, of course, that the brake mechanism is not restricted to use for braking vehicles. However, as this is perhaps the most extensive field of application of the invention, its embodiment in practical form will be described, by way of example, for both the front and rear wheels of a motor vehicle. The braking mechanism has been so designed as to be readily applicable to the usual wheel mounting which in the case of the rear or power driven wheels embodies a rear axle 3 which extends through the usual housing 4, the outer end of the axle projecting beyond the housing as at 5. A spider 6 is mounted on the axle section 5 and is provided with a hub 7 which is adapted to be keyed thereto as at 8, the spider including arms 9 to which the tire rim 2 may be secured in a well known manner, as by means of a series of stud bolts 11 which pass through the rim ring 12 which is fixed to the rim as by rivets 13 or formed integral with the rim, this ring being adapted to abut against the outer extremities of the spider arms 9. Interposed between the spider and the housing are the usual anti-friction bearings 14 and oil retainer 15. So much of the construction just described is more or less conventional.

Carried by the outer end of the housing 4 is a rear plate or flange 16 which may be welded thereto as at 17 or integrally formed with the housing 4, as desired. The outboard side of the plate 16 is channeled as at 18 for receiving the hydraulic brake-controlling medium which is adapted to be admitted into the channel through the conduit or line 19 and connecting nipple 20.

As shown in Fig. 2, the connecting nipple 20 is adapted to be screwed into a boss 20' formed on the rear face of the plate 16 and communicating with the channel 18 through the intermediary of the fluid passage 21. The channel 18 may be milled or formed in the plate 16 as an integral construction, as best shown in Fig. 11, or the channel may be constructed in the form of a separate annular collar of substantially U-shaped cross section which may be secured to the plate 16 as by welding. The latter type of construction may be readily understood from reference to Fig. 10, although in this figure the plate or flange 16, as shown, forms a part of a front wheel mounting. The constructions of the plate, however, are generally similar.

16' designates the welds for the modified channel construction where the channel is formed separately and is subsequently applied to the plate or flange 16.

The brake assembly unit will now be described. This unit embodies three principal plate-like elements, one of which I have termed a power plate or energizer, designated 22. This energizer member 22 is disposed about the annular channel 18 so as to lie closely adjacent to the flange or plate 16, to which it is adapted to be removably secured as by means of a plurality of bolts 23, the inner threaded ends of which extend freely through suitable openings 24 formed in the plate 16, the bolts passing through suitable threaded apertures 25 in the energizer plate 22 into which the bolts 23 are adapted to be screwed. Nuts 26 on the inner ends of the bolts 23 serve to hold the energizer plate 22 in fixedly secured relation to the flange or plate 16.

The energizer plate is preferably provided with a plurality of recesses 27 shaped to snugly receive insert plates or discs 28 which are preferably case-hardened or formed of a material which will resist wear, as for example hardened tool steel. Each of the inserts is free to move angularly in its respective recess, and is provided with a slot-like recess or groove 29 having inclined faces to produce a camming action as will hereinafter become more apparent.

Outwardly disposed respecting the energizer plate 22 is arranged a braking member or disc 30 which is carried by the housing 4 so that the disc 30 may move laterally towards and away from the energizer plate 22, and also move rotatably relatively thereto.

The disc 30 is provided with elongated holes or slots 31 through which the bolts 23 extend, the width and length of the slots being greater than the diameter of the bolts to permit the lateral and rotary movement of the braking disc and to prevent stopping said disc in its rotary movement to braking action without permitting any canting or tilting of the disc.

The length of these slots 31 is great enough to afford a limited amount of rotary movement of the disc relatively to the energizer 22. Recesses 27', similar to recesses 27, hereinbefore referred to, are provided in the inner or inboard face of the braking disc 30, and are adapted to receive inserts 28' having cam grooves or recesses 29' therein, as in the case of inserts 28.

As illustrated in Fig. 7, the inserts 28' are adapted to be held against angular movement in their recesses by means of the radially extending protuberances or pins 32.

The cam grooves or recesses 29 and 29' are disposed in opposed relation so as to provide pockets therebetween for receiving in each pocket a roller 33, which is free or unattached to either the energizer plate 22 or the braking disc 30. It will be understood that the roller in each pocket is free to ride up or roll along one inclined side of the cam groove of one insert recess, while acting simultaneously with the correspondingly opposed inclined side of the cam groove of the other recesses, incident to relative rotary movement of the brake disc 30 respecting the energizer plate 22.

By reason of the freedom of movement of one set of inserts, the opposed cam grooves are always maintained in parallel relation so that stress on the rollers is uniform over their entire length, instead of being concentrated at one end or the other. This feature forms the subject matter of my co-pending application Serial No. 13,555 hereinbefore referred to.

Laterally outwardly spaced from the braking member or disc 30 is another braking member or disc 34 having apertures 35 extending therethrough, through which the bolts 23 pass. These openings 35 closely embrace the bolts 23 although they are preferably large enough to permit the bolts 23 to pass freely therethrough. Rotary movement of the brake disc 34 is prevented, and the heads 36 on the outer ends of the bolts 23 abut the outer face of the braking disc 34 and restrain this disc against lateral outward movement.

The inner faces of each of the braking discs 30 and 34 constitute braking surfaces. Interposed between the braking discs 30 and 34 is a ring or disc 38 which is fixed to rotate with the wheel 1, but arranged to shift axially or laterally to adjust itself relatively to the two braking discs. The opposite faces of the ring are preferably provided with brake linings 37 for engagement with the braking faces of the discs 30 and 34. The ring is provided with one or more outstanding lugs 39 provided with an aperture for receiving a pin 40 which serves to guide the ring 38 and impart rotation thereto.

The pins 40 may be formed as an integral extension of studs 11 by means of which the demountable rim 2 is adapted to be secured to the spider 6. If desired, a rubber grommet or bushing 41 may be interposed between the pin 40 and the walls of the opening in the ring 38 through which the pin extends. The ring 38 is adapted to receive a power delivered braking thrust so that the effect is an ultimate braking action on the wheel 1. The manner in which the braking thrust is applied will now be described.

Formed on the inboard or inner face of the braking disc 30 is an annular flange or collar 42 which is adapted to be received in the channel 18, this collar 42 constituting a piston to which the pressure of the hydraulic medium is transmitted by force within the channel 18. A rubber ring 43 is preferably interposed between the piston 42 and the base of the channel 18 so as to form a seal and prevent the escape at high or low pressure of the hydraulic medium past the piston.

Now when the hydraulic medium pressure is admitted into the channel or cylinder 18, the admission being controlled in the usual manner of hydraulic braking systems, an initial laterally outward thrust is imparted to the braking disc 30 so that its braking surface is brought into engagement with the adjacent brake lining 37 on the ring 38. The wheel 1 and ring 38 having a rotary motion respecting the wheel mounting, the initial engagement of the braking disc 30 with the ring 38 causes the braking disc 30 to have a limited rotary movement, with the result that the rollers 33, co-acting with the grooves or recesses 29 and 29', cam or wedge the braking disc 30 further laterally outwardly relatively to the fixed energizer plate 22, the extent of this latter movement being proportional to the rotative force of the wheel, that is, the power to be absorbed.

As the braking disc 30 is forced outwardly, the ring 38 correspondingly shifts laterally outwardly on the pins 40 so that the braking action is effective on both sides of the ring, as will be obvious. When the pressure of the hydraulic medium on the piston 42 is relieved, the braking discs 30 and 34 are urged apart; that is to say, the disc moves laterally inwardly, under the influence of a plurality of springs 44 interposed between the discs 30 and 34 in uniformly spaced relation to each other, the opposite ends of the springs respectively seating in recesses or seats 45 in the discs 30, and 46 in the disc 34.

The hydraulic brake control just referred to preferably is employed for the usual service brake operation. I also preferably provide in the case of the rear wheels a separate brake control which is operable independently of the hydraulic control, this separate brake control being utilized as a parking brake.

As illustrated in Fig. 5, the parking brake actuating mechanism embodies suitable mechanical instruments including an axially shiftable thrust pin 47 which is adapted to extend through the flange or plate 16 and also through the energizer plate 22 so that its outer end 48 may be brought into abutting engagement with the inner brake disc 30. The outer end of the thrust pin is pivotally connected, as at 49, with a bell crank lever 50, this latter lever being pivotally mounted as at 51 on the plate 16 as by means of a supporting bracket or boss 52 integrally formed on the plate 16 or welded thereto as at 53. The bell crank lever may be connected with the usual brake rod 54 which is operated by any conventional hand brake (not shown).

The brake assembly unit is preferably substantially enclosed so as to exclude water, dirt, and other foreign matter, and for this purpose I provide an inner or rear dust cover 55, best seen in Fig. 2, which may be secured as by screws 56 to the rear face of the energizer plate 22. The front or outer dust cover 57 is connected with the spider, as by screws 58, and is provided with a central opening for receiving the usual hub cap 59.

From the foregoing description, it will be observed that the brake assembly unit may be conveniently mounted on and removed from the wheel mounting. For instance, and referring to Fig. 2, removal of the brake unit can be accomplished as follows. By removing the hub cap 59, so as to give access to the usual nuts 60 which hold the wheel 1 on the axle 5, and removing these nuts 60, the wheel may be pulled off of the axle. In so doing, the pins 40 are withdrawn from the openings in the ring 38, it being understood that the ring 38 is freely shiftable laterally respecting the pins 40 or vice versa. Having removed the wheel, it is only necessary to remove the nuts 26 from the bolts 23 to completely free the brake assembly unit which can then be removed as a unit, as generally depicted in Fig. 4.

Since the bolts 23 have threaded engagement with the energizer plate 22, the previous adjustment of the parts of the brake assembly unit need not be disturbed when the unit is removed. The adjustment of the unit is intended to be made by applying a wrench to the heads 36 of the bolts 23 and screwing the bolts in one direction or the other in the threaded openings 26 in the energizer plate 22. The adjustment of the unit may be originally made with greater accuracy and to better advantage before the unit is mounted. Further adjustments may either be made while the unit is mounted or after removing the unit as just described.

As the unit is dismounted, the energizer plate 22, brake discs 30 and 34 with the ring 38 interposed therebetween and the springs 44 also interposed between the brake discs, together with the rollers 33 interposed between the brake disc 30 and the energizer plate 22, remain in assembled relation and are so held by the bolts 23.

The foregoing description has particular relation to the application of my improved brake assembly unit to the rear or power driven wheels, but it will be understood that the assembly unit is practically the same in both construction and operation in the case of a front or steering wheel. The principal difference resides in the wheel mounting itself rather than in the brake assembly unit. Also, in the case of the front wheels, the parking brake would ordinarily be omitted.

Figs. 3 and 4 illustrate the manner in which the brake unit may be applied to the dirigible front wheels, and in these views the same reference characters have been applied to those parts which are the same as previously described in relation to the rear wheel assembly.

61 designates generally a well known type of front wheel mounting embodying a steering spindle 62 pivotally mounted on the front axle 63 by means of the king bolt 64. The dead or stub axle 65 is preferably formed as an integral part of the spindle and I also preferably form the flange or plate 16'', corresponding to flange 16, as an integral part of the spindle so that it may be machined along with the machining operations usually required in finishing the spindles. As previously mentioned, the channel or cylinder 18' may be integrally formed with the plate 16'' or formed as a separate collar-like element secured to the plate 16'' as by welding at 16'. (See Fig. 10.) The boss 20'' with which the hydraulic fluid line 19 is adapted to be connected, may be integrally formed with the plate 16'' or as a separate element 20''', welded thereto, as shown in Fig. 10.

These slight differences in the structural details of the front wheel and mounting are not considered a variation since they are not directly related to and do not modify the structure or operation of the combination incorporating the invention and have only been illustrated and described to emphasize the practical application of the invention to different types of wheel mountings.

As shown in Fig. 3, the spider 6', to which the demountable rim 2 is secured as in the construction of Fig. 2, has a slightly different form in that the hub portion 7' receives a bearing unit 14' in its outer end as well as in its inner end, both bearing units being interposed between the hub and the axle 65.

To conserve space, the removal or application of the brake assembly unit has been particularly illustrated in relation to the front wheel type of mounting only, (see Fig. 4) although it is to be understood that this same general condition might have been shown in conjunction with the rear wheel mounting.

Referring particularly to Figures 12 and 13, which disclose in detail the mounting of the springs 44, it will be observed that when the braking disc 30 is forced into braking engagement with the rotary disc 38 carried by the wheel spider, these springs are compressed or put under tension.

As shown in dotted lines in these figures, upon the relative rotary movement of the braking disc 30 due to its engagement with the rotary disc or ring 38, the spring members 44 are caused to be deformed laterally as well as axially, so that, when the braking disc is released, the spring members operate not only to force the braking disc 30 laterally away from the braked rotary disc 38, but also to rotate the disc 30 back to its initial disengaged position, wherein the roller member 33 is disposed at the base of the camming recesses in the insert members 27 and 28. This compound action of the spring members 44 eliminates the necessity of a separate spring for rotating the relatively movable disc back to its non-engaging position after it is released.

Figure 13 shows a slightly modified form of spring mounting in which one of the spring seating recesses is considerably deeper than the other. In this form, one end of the spring 44 is seated in the deep recess which positively prevents any tilting of the spring when the relatively movable braking disc is shifted to braking position. The torsional stress set up in the spring due to the relative lateral movement of the ends of the spring, as shown in dotted lines, always tends to return the relatively movable plate to its initial non-braking position, as previously indicated, but due to the rigid support afforded for one end of the spring in the comparatively deep, closely-fitting recess or socket, the return action of the spring in this form is greater than when the two recesses are somewhat shallower.

Further detailed description of the brake assembly unit and the operation thereof in its application to a front or dirigible wheel is considered to be unnecessary, in view of the detailed showing in the drawings and the full description of the parts and explanation of their operation in the rear wheel application.

While the structural details have been herein shown and described, the invention is not confined thereto as changes and alterations may be made without departing from the spirit thereof as defined by the appended claims.

I claim:

1. In a brake mechanism of the class described, a support, a unitary brake assembly constructed to be readily attached to and detached from its operative position as a unit and comprising a stationary part, a brake member adjacent said stationary part movable rotatably and laterally relatively thereto, means interposed between said brake member and stationary part for imparting lateral thrust to said brake member incident to rotary movement of the latter, and means connecting said stationary part and brake member together and to the support, with the thrust means disposed between the stationary part and brake member whereby to provide a brake assembly of unitary form which may be mounted and dismounted with the elements thereof in their assembled relation aforesaid.

2. Brake mechanism as claimed in claim 1 wherein the assembly unit includes a rotary member having means adapted to be fixedly connected for rotation with a rotary part to be braked and associated with said brake member for operative engagement of the latter therewith responsive to lateral thrust of the brake member.

3. Brake mechanism as claimed in claim 1 wherein the assembly unit includes a rotary member adapted to be fixedly connected for rotation with a rotary part to be braked and associated with said brake member for operative engagement of the latter therewith responsive to lateral thrust of the brake member, and a second brake member laterally spaced from the first mentioned brake member and also connected with said stationary part by said connecting means, and the member which is adapted to be connected with the rotary part to be braked being disposed intermediate said brake members and being laterally shiftable for engagement with the second mentioned brake member responsive to lateral thrust of the first mentioned brake member.

4. The combination with a wheel mounting, of a supporting plate carried thereby and extending radially outwardly therefrom at the inner side of the wheel, and a brake assembly unit, including a part adapted to be connected with the wheel for rotation therewith and to which the braking force is applied, and including common means for removably securing the parts of said brake assembly unit together and to the supporting plate aforesaid while in an assembled condition, a wheel unit mountted on said wheel mounting, means for securing the unit on the mounting, and means carried by said wheel unit with which the parts to which braking force is applied is slidably connected, whereby the wheel unit may be disconnected upon removal of its securing means aforesaid without disturbance of the braking assembly unit.

5. The combination with a wheel mounting, of a supporting plate having an outwardly facing annular channel therein for receiving a hydraulic fluid medium, an energizer plate fixed to said supporting plate, a brake disc carried by said supporting plate and having an annular piston adapted to be received in the channel of the supporting plate, said brake disc being mounted on said supporting plate for rotary movement and for lateral movement responsive to pressure of the hydraulic fluid medium within the channel on the piston, means interposed between the brake disc and energizer plate for imparting lateral movement to the brake disc responsive to rotation of the latter, and means associated with said brake disc and frictionally engageable therewith incident to lateral movement of the brake disc, said last named means being adapted to be detachably connected with a wheel to be braked.

6. The combination with a wheel mounting, of a supporting plate having an outwardly facing annular channel therein constituting a hydraulic cylinder, an energizer plate fixed to said supporting plate, a pair of laterally spaced brake discs carried by said supporting plate, one of said brake discs being mounted upon said supporting plate for rotary and lateral movement, and having an annular piston adapted to be received in the hydraulic cylinder aforesaid, means interposed between the last mentioned brake disc and the energizer plate for imparting lateral movement to the brake disc responsive to rotation of the same, and means interposed between said brake discs and frictionally engageable therewith incident to lateral movement of the rotatable brake disc, said last named means being adapted to be detachably connected with a wheel to be braked.

7. A brake assembly unit comprising an energizer plate, a plurality of bolts threadedly connected therewith and extending therethrough so as to project at opposite sides therefrom, a plurality of brake discs mounted on said bolts at one side of said energizer plate, one of said brake discs being free to move laterally on said bolts towards and away from said energizer plate, and also being free to move rotatively relatively to said energizer plate, means interposed between said last mentioned brake disc and said energizer plate for imparting lateral movement to said brake disc in a direction towards the other brake disc responsive to rotation of the former, means interposed between the said brake discs and frictionally engageable therewith incident to the aforesaid lateral movement, said last named means being adapted to be detachably connected with a rotary member to be braked, and means co-acting with the projecting ends of the bolts at the side of the energizer plate opposite to the brake disc supporting ends, for fixedly securing the aforementioned elements to a stationary part associated with the member to be braked while in the assembled relation set forth.

8. A brake assembly unit comprising an energizer plate, a plurality of bolts adjustably connected therewith and extending therethrough so as to project at opposite sides therefrom, a plurality of brake discs mounted on said bolts at one side of said energizer plate, one of said brake discs being free to move laterally on said bolts towards and away from said energizer plate, and also being free to move rotatively relatively to said energizer plate, means interposed between said last mentioned brake disc and said energizer plate for imparting lateral movement to said brake disc in a direction towards the other brake disc responsive to rotation of the former, means interposed between the said brake discs and frictionally engageable therewith incident to the aforesaid lateral movement, said last named means being adapted to be detachably connected with a rotary member to be braked, and means coacting with the projecting ends of the bolts at the side of the energizer plate opposite to the brake disc supporting ends, for removably securing the aforementioned elements to a stationary part associated with the member to be braked while in the assembled relation set forth.

9. A brake assembly unit comprising a pair of laterally spaced braking discs, one of said braking discs being movable laterally and rotatably, a rotary member mounted between said braking discs for frictional engagement with said braking discs, an energizer plate disposed adjacent to the laterally movable braking disc, means interposed between said last mentioned braking disc and the energizer plate for imparting lateral thrust to the former incident to relative rotation thereof respecting the energizer plate, and means extending through said braking discs and also through said energizer plate for securing the elements aforesaid in their assembled condition as set forth, said means being adjustable to variably limit the lateral movement of the laterally movable braking disc and including means for detachably mounting the elements in operative association with a member to be braked while in their aforesaid adjustable assembled relation, and permitting removal of the same without disturbing the adjustment.

10. Brake mechanism as claimed in claim 1, in combination with hydraulically operable means for imparting lateral thrust to said brake member, and separate mechanically operable means for imparting such lateral thrust independently of the hydraulically operable means.

11. Brake mechanism as claimed in claim 1, in combination with hydraulically operative means for imparting lateral thrust to said brake member, and separate mechanically operable means for imparting such lateral thrust independently of the hydraulically operable means, said mechanically operable means including a thrust pin extending through the stationary part for engagement of one end of the thrust pin with the brake member, and a pivotally mounted bell crank lever pivotally connected with the opposite end of said thrust pin for moving said thrust pin axially.

12. In a device of the class described, a rotary member to be braked, a pair of braking members mounted one at each side of the rotary member and adapted for braking engagement therewith, one of said braking members being laterally shiftable and also rotatable with respect to the other braking member, an energizer member adjacent to the laterally movable braking member, means for moving said laterally movable braking member into frictional engagement with the rotary member to be braked, whereby to produce a relatively rotatable movement between the braking member and its associated energizer member, means interposed between the laterally movable braking member and its associated energizer member automatically operable by rotative rotary movement thereof to cause further lateral and rotary movement of said laterally and rotary mounted braking member to produce a braking engagement thereof with the member to be braked, and resilient means between the two braking members tensioned to force the braking members apart and rotate the rotary braking member in an opposite direction with respect to the member to be braked to return the same to its initial non-braking position.

HOMER T. LAMBERT.